United States Patent
Wong et al.

(10) Patent No.: US 10,089,488 B2
(45) Date of Patent: *Oct. 2, 2018

(54) SYSTEMS, METHODS, AND APPARATUSES FOR IMPLEMENTING CROSS-ORGANIZATIONAL DATA SHARING

(71) Applicant: salesforce.com, inc., San Francisco, CA (US)

(72) Inventors: Simon Y. Wong, San Carlos, CA (US); Igor Tsyganskiy, Los Altos, CA (US); Patrick John Calahan, San Francisco, CA (US); Alexandre Hersans, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/585,881

(22) Filed: May 3, 2017

(65) Prior Publication Data

US 2017/0364695 A1 Dec. 21, 2017

Related U.S. Application Data

(60) Continuation of application No. 14/937,698, filed on Nov. 10, 2015, now Pat. No. 9,646,169, which is a division of application No. 14/133,592, filed on Dec. 18, 2013, now Pat. No. 9,185,078.

(60) Provisional application No. 61/738,946, filed on Dec. 18, 2012.

(51) Int. Cl.
*H04L 29/06* (2006.01)
*G06F 21/62* (2013.01)
*G06F 17/30* (2006.01)

(52) U.S. Cl.
CPC .... *G06F 21/6218* (2013.01); *G06F 17/30864* (2013.01); *H04L 63/0281* (2013.01); *H04L 63/10* (2013.01)

(58) Field of Classification Search
USPC .......................................................... 726/4
See application file for complete search history.

(56) References Cited

U.S. PATENT DOCUMENTS

| 6,185,572 | B1 * | 2/2001 | Blackman ......... G06F 17/30607 |
| 7,412,577 | B2 * | 8/2008 | Boyd .................. G06F 11/2064 |
| | | | 711/161 |
| 2005/0086384 | A1 * | 4/2005 | Ernst ...................... G06F 17/30 |
| | | | 709/248 |

(Continued)

*Primary Examiner* — Jason Lee
(74) *Attorney, Agent, or Firm* — Elliott, Ostrander & Preston, P.C.

(57) ABSTRACT

In accordance with disclosed embodiments, there are provided methods, systems, and apparatuses for implementing cross organizational data sharing including, for example, means for storing customer organization data in a database of the host organization; allocating at least a sub-set of the customer organization data to be shared as shared data; configuring a hub to expose the shared data to a proxy user and configuring the proxy user at the hub with access rights to the shared data; configuring one or more spokes with access rights to the shared data of the hub via the proxy user; receiving a request from one of the hubs for access to the shared data of the customer organization via the proxy user at the hub; and returning a response to the hub having made the request. Other related embodiments are disclosed.

20 Claims, 14 Drawing Sheets

(56) References Cited

U.S. PATENT DOCUMENTS

2007/0168958 A1\* 7/2007 Huang ................ G06Q 10/00
717/120
2009/0307599 A1\* 12/2009 Davies ................ G06Q 10/06
715/738

\* cited by examiner

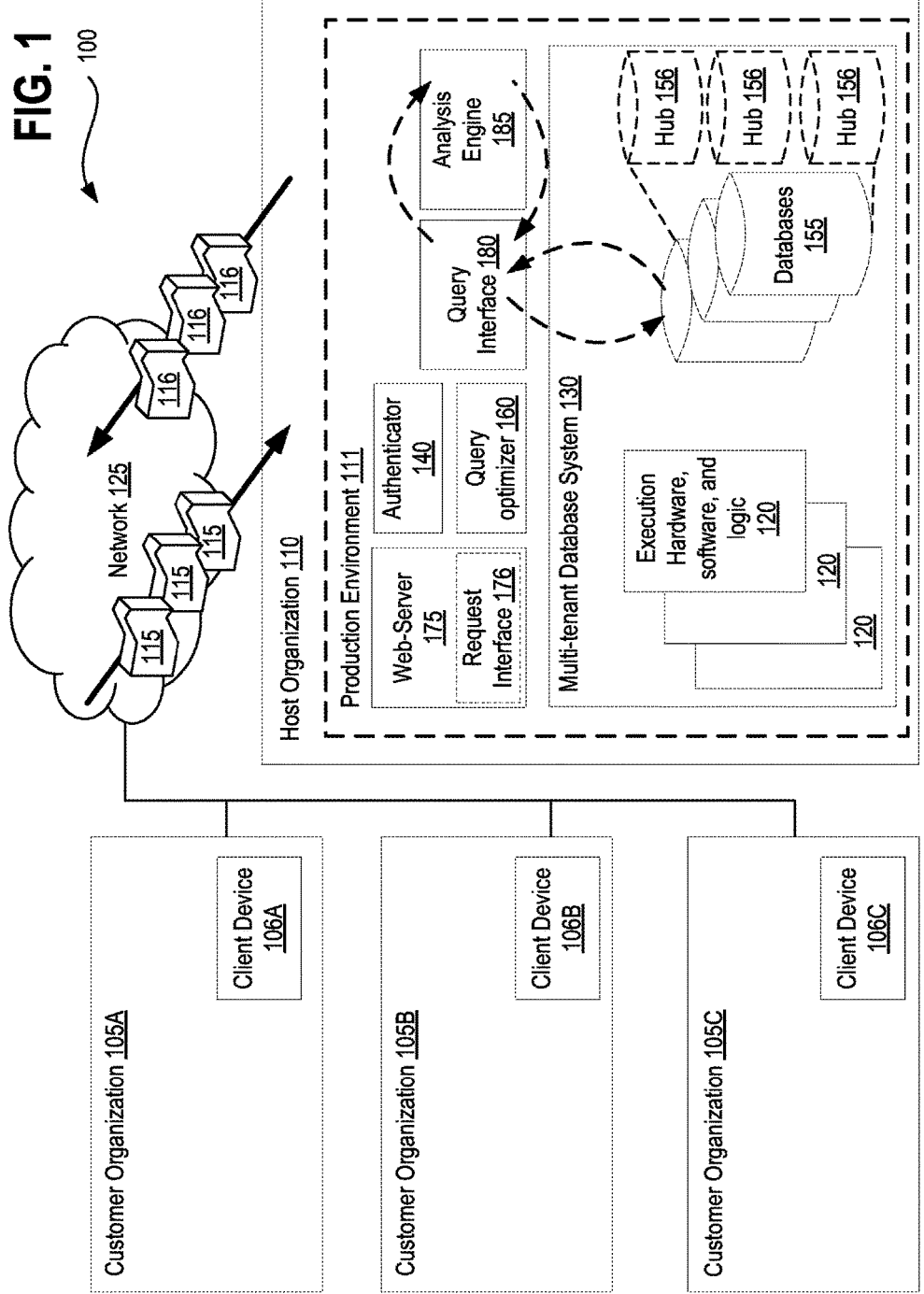

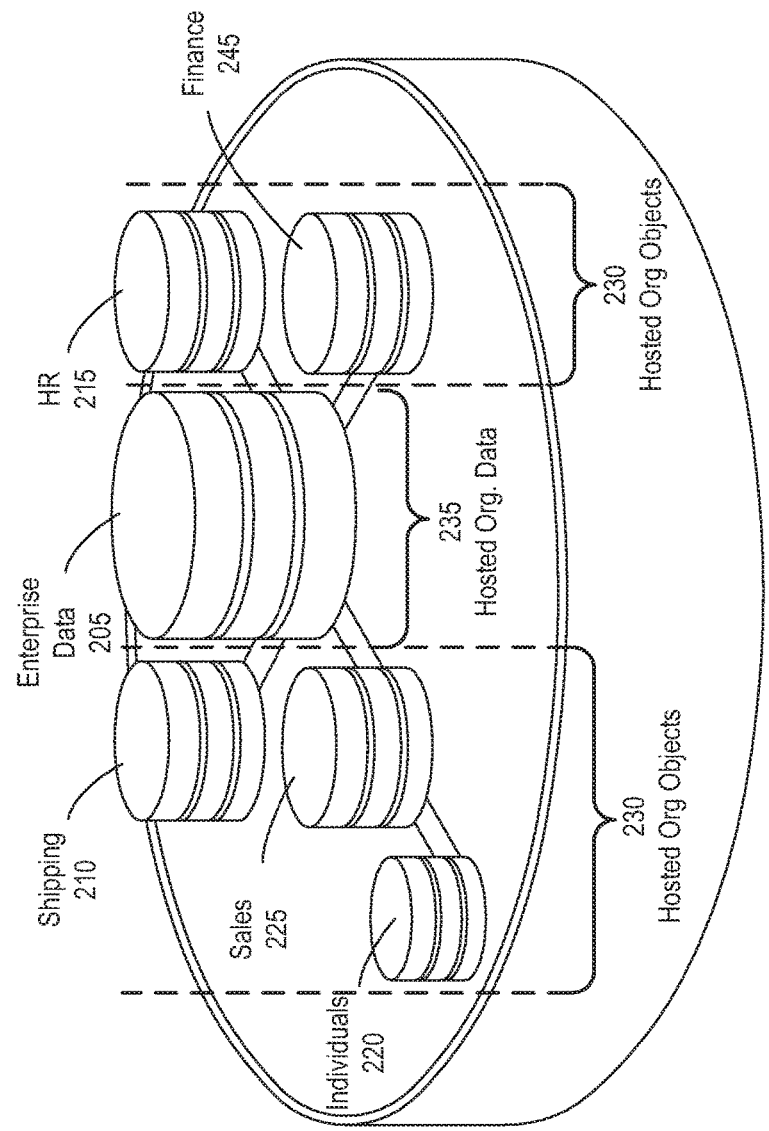

300

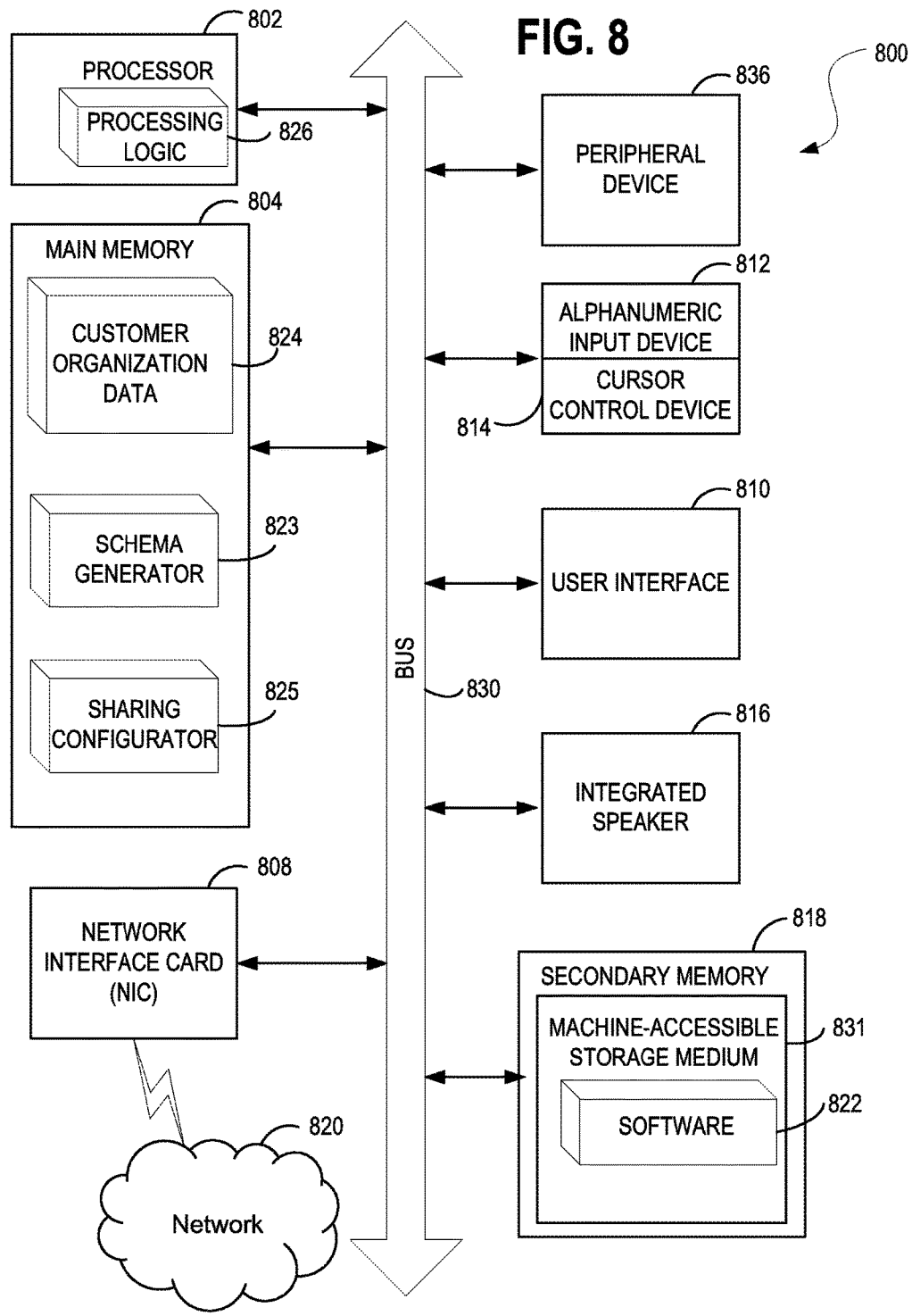

SYSTEMS, METHODS, AND APPARATUSES FOR IMPLEMENTING CROSS-ORGANIZATIONAL DATA SHARING

CLAIM OF PRIORITY

This continuation application is related to, and claims priority to, the divisional application filed on Nov. 10, 2015, having an application Ser. No. 14/937,698; this application is further related to, and claims priority to the utility application entitled "SYSTEMS, METHODS, AND APPARATUSES FOR IMPLEMENTING CROSS ORGANIZATIONAL DATA SHARING," filed on Dec. 18, 2013, having an application Ser. No. 14/133,592; this application is further related to, and claims priority to the provisional utility application entitled "CROSS ORG DATA SHARING," filed on Dec. 18, 2012, having an application No. 61/738,946, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of computing, and more particularly, to systems, methods, and apparatuses for implementing cross organizational data sharing.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

A single a multi-tenant database system operates to store data on behalf of a multitude of paying subscribers, each being a "tenant" of the database system, hence the term multi-tenant database system.

It is sometimes desirable to share data stored within the multi-tenant database system amongst users. Unfortunately, prior solutions required a peer to peer model of sharing that necessitated data marked for sharing to be copied and represented within two or more locations. Specifically, the data would exist in its original location but then also be replicated into additional locations accessible to peers with whom the data was to be shared.

While such a peer based model works with a low volume of sharing it does not scale to a larger database environment where many users within the multi-tenant database system share significant quantities of data as the volume of data being replicated is too large resulting in massive inefficiencies and increased operational costs.

The present state of the art may therefore benefit from the systems, methods, and apparatuses for implementing cross organizational data sharing as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 1 depicts an exemplary architecture in accordance with described embodiments;

FIG. 2 depicts another exemplary architecture in accordance with described embodiments;

FIG. 8 illustrates a diagrammatic representation of a machine in the exemplary form of a computer system, in accordance with one embodiment.

DETAILED DESCRIPTION

Figure 3A:
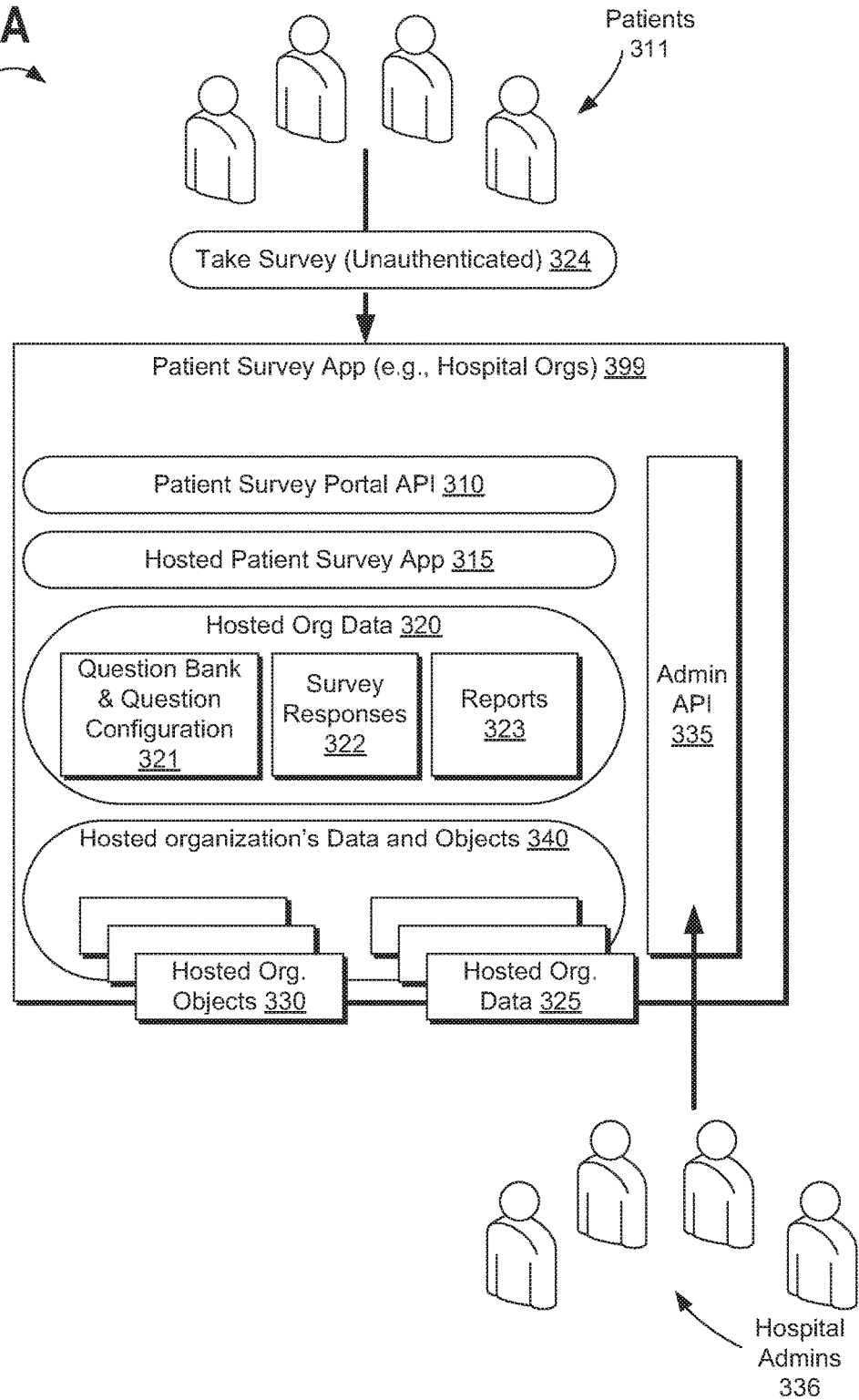
FIG. 3A depicts another exemplary architecture in accordance with described embodiments.

Described herein are systems, methods, and apparatuses for implementing cross organizational data sharing in an on-demand service environment. Such systems, devices, and methods may include, for example, means for: storing customer organization data in a database of the host organization; allocating at least a sub-set of the customer organization data to be shared as shared data; configuring a hub to expose the shared data to a proxy user and configuring the proxy user at the hub with access rights to the shared data; configuring one or more spokes with access rights to the shared data of the hub via the proxy user; receiving a request from one of the hubs for access to the shared data of the customer organization via the proxy user at the hub; and returning a response to the hub having made the request.

Described herein are methodologies for accommodating cross organizational data sharing in a large and complex multi-tenant database system which more efficiently accommodates very large volumes of data without necessitating that such data be replicated. For example, users having data to share can keep their data centrally located, dynamically share their data with others, and permit such sharing without having to replicate their data to other peer nodes where another user or entity may access the data, as is common with prior solutions.

Shared data may be stored within a logical "hub" from which "spokes" can dynamically access the data from the hub without having to make a local copy of the data for each user or peer wishing to access the data. Unlike prior solutions which required n+1 copies of data to support the original user and n peers, as well as complex synchronization and maintenance of the multiple n+1 copies of the data, methodologies described herein operate with greater efficiency, reduced complexity, and drastically reduced storage requirements as there is no need to create additional copies of data to be shared.

In a particular embodiment, data to be shared is stored within a hub and within each of one or more spokes there are users or user access rights for the data to be shared from the hub. When the users at the spokes request access to the data in the hub, they are routed through a proxy user residing directly within the hub itself. For instance, a hub may reside within the customer's org, which is referred to as the hub org, and any user seeking access to the data to be shared then proxies their request from a spoke into the hub org to facilitate the data request.

Each spoke may possess any number of users within the spoke and all users within any particular spoke will have the same rights as derived from that particular spoke. If different classes of users require different access rights or access to different sub-sets of data, then distinct spokes can be created referencing back to the same hub. The hub itself is a sub-set of one customer organization's data, the sub-set being defined by what data that customer organization has elected to share or make accessible for sharing via the established hub. While a single spoke may support multiple human users, each with identical rights as derived from that spoke, there is exactly a 1:1 correspondence for each spoke to proxy users in the hub, with the proxy user having the appropriate access rights to the shared data commensurate with the requirements of the spoke to the extent such requirements are permitted and authorized by the hub and the hub's administrator.

Customer organizations wishing to share their data therefore select or define a sub-set of their data to logically reside within the hub, without having to copy such data, and then define what rights (e.g., read only, read/write, read/write but no record creation/deletion, etc.) are given to one or more spokes and corresponding proxy users in the hub. For each proxy user, rights can be assigned to individual records or at the table level. Thus, the proxy users within the hub are enabled to see the particular rows according to the shared data by the customer organization, and these proxy users enable a corresponding view to users at the complementary spoke. In certain embodiments, the customer organization sharing data may place all of their data into a hub and specify read-only access. In other embodiments, the customer organization sharing data may place a sub-set of their data into a hub but specify write-back access in addition to read access.

Such a model may be of benefit to organizations having internal hierarchy, such as with a franchise and franchisees. For example, the franchise may own certain data which should be made available for read access (such as procedures, pricing, etc.), whereas other tables are more appropriate for read/write access (e.g., such as procurement orders, monthly reporting by franchisees, etc.). Such a model permits sub-organizations to be able to view one class of data without modification writes and then separately generate and write back other classes of data, according to the controls of the customer organization enabling the sharing. Moreover, because data is not copied or replicated across multiple distinct storage locations it is therefore unnecessary to perform data synchronization and data conflict resolution techniques as was required with prior solutions.

In other embodiments, multiple spokes are created which enable sharing of the same sub-set of a customer organization's data, but with different access rights allocated or defined for the different spokes.

Still other embodiments are provided for packaging, distribution, and versioning in support of the cross organizational data sharing methodologies as set forth herein.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems where are not directly discussed.

FIG. 1 depicts an exemplary architecture 100 in accordance with described embodiments. In one embodiment, a production environment 111 is communicably interfaced with a plurality of client devices 106A-C (e.g., such as mobile devices, smart phones, tablets, PCs, etc.) through host organization 110. In one embodiment, a multi-tenant database system 130 includes databases 155, for example, to store tables, datasets, and underlying database records with user data on behalf of customer organizations 105A-C or users. Any of the customer organizations 105A-C may share their data or a sub-set of their data via a hub 156 and designate corresponding access rights to one or more spokes through which users are enabled to access the data placed into a hub 156. The hubs 156 themselves are not separate stores, but rather, are logical representations for all or a sub-set of a customer organization's data which is already stored within the databases 155 along with special access rights to permit cross-organizational sharing of such data.

Multi-tenant database system 130 includes a plurality of underlying hardware, software, and logic elements 120 that implement database functionality and a code execution environment within the host organization 110. In accordance with one embodiment, multi-tenant database system 130 further implements databases 155 to service database queries and other data interactions with the databases 155. The hardware, software, and logic elements 120 of the multi-tenant database system 130 are separate and distinct from a plurality of customer organizations (105A, 105B, and 105C) which utilize the services provided by the host organization 110 by communicably interfacing to the host organization 110 via network 125. In such a way, host organization 110 may implement on-demand database services or cloud computing services to subscribing customer organizations 105A-C.

Host organization 110 receives input and other requests 115 from a plurality of customer organizations 105A-C via network 125 (such as a public Internet). For example, incoming database queries, API requests, interactions with displayed graphical user interfaces and displays at the client devices 106A-C, or other inputs may be received from the customer organizations 105A-C to be processed against the multi-tenant database system 130, including queries to read, write, and update data stored within the databases 155 and potentially shared via a hub 156.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its multi-tenant database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 and provide a web-based interface or other graphical displays to an end-user client device 106A-C or machine originating such data requests 115.

Authenticator 140 operates on behalf of the host organization to verify, authenticate, and otherwise credential users attempting to gain access to the host organization as well as those users requesting access via a spoke to another customer organization's data having been shared from a hub 156.

Query interface 180 provides functionality to pass queries from web-server 175 into the multi-tenant database system 130 for execution against the databases 155 or other data stores of the host organization's production environment 111. In one embodiment, the query interface 180 implements an Application Programming Interface (API) through which queries may be executed against the databases 155 or other data stores. Query optimizer 160 performs query translation and optimization, for instance, on behalf of other functionality such as functionality of a graphical interface which possesses sufficient information to architect a query yet lacks the necessary logic to actually construct the appropriate query syntax. In other instances, query optimizer 160 modifies a submitted query to optimize its execution within the host organization without affecting the resulting dataset returned responsive to such an optimized query. Analysis engine 185 operates on behalf of functionality within the host organization to perform additional data evaluation where necessary, such as evaluating access rights by a user at a spoke requesting data shared by another customer organization via a hub 156.

Host organization 110 may implement a request interface 176 via web-server 175 or as a stand-alone interface to receive requests packets or other requests 115 from the client devices 106A-C. Request interface 176 further supports the return of response packets or other replies and responses 116 in an outgoing direction from host organization 110 to the client devices 106A-C.

FIG. 2 depicts another exemplary architecture 200 in accordance with described embodiments. In particular, there is depicted a hosted organization's data 235 having enterprise data 205 stored therein, for instance, at a database or at a multi-tenant database system. Multiple hosted organization objects 230 are additionally depicted, including shipping 210, sales 225, individuals 220, HR 215, and finance 245. Application of the described embodiments are not, however, limited to the exemplary auto dealership and hospital survey examples described herein.

Cross organization data sharing ("SDS") is a hub and spoke data hub structure which enables different customer organizations to securely share their hosted organization data 235 data across organizations either within the same POD or across different PODs. Organizations granted access to such shared data are therefore able to transparently access the shared objects using the same SOQL and API calls and queries as is done when accessing regular non-shared objects. Individual organizations having their data hosted by the multi-tenant database system and shared via a hub are therefore able to define which set of records in a shared object to share and also to what extent access is granted to the set of records shared.

Unlike prior server-to-server (S2S) solutions which replicate and then synchronize data to enable sharing, there is no data synchronization required as only a single original copy of the shared data is maintained. The cross organization data sharing described here does, however, enable an access and sharing model that greatly improves performance through reduced storage requirements and reduced overhead compared to prior solutions.

By storing one copy of data in a hub the overhead of data synchronization and field type mapping is wholly eliminated. Moreover, complex object relationships are preserved without the risk of references being out of sync.

Where prior sharing models failed to scale beyond a very small number of customer organizations due to exponentially increasing resource demands due to the inefficient data replication and synchronization required by such prior solutions, the methodologies described herein are capable of supporting thousands of distinct customer organizations and their hosted organization data 235 within a single common multi-tenant database system.

As depicted here, all of a hosted organization's data 235 may reside as enterprise data 205 as a single instance within a database, but the hosted organization's data may nevertheless be represented in a variety of ways, using a variety of different sub-sets of data, and using a variety of different access rights. For instance, each department within a particular customer organization may be given their own hosted object through which they can access shared data belonging to the customer organization. As depicted here, each of shipping 210, sales 225, various individuals 220, HR 215, and finance 245 are correlated to a distinct hosted organizational object, each of which may permissibly be allocated or associated with distinct record sets and distinct access rights, if granted such access by the customer organization.

Take for example an automobile manufacturer with 1600 dealerships across 86 countries which must manage their marketing and sales processes. Due to regulation and local business practice differences, many dealerships may manage the business processes of dealing with customers and sales approval on their own. Many of the 1600 dealerships may also use different Customer Relationship Management (CRM) systems, leading to additional cost, complexity, and inconsistencies. But notwithstanding the above, all of the 1600 dealerships operating on behalf of the single automobile manufacturer are selling a common set of products and it would be of benefit to the automobile manufacturer to directly interface with the dealers so that sales leads known to the automobile manufacturer may be distributed as effectively as possible to the various dealers or such that leads generated by the dealers themselves may be re-distributed amongst other dealers, when appropriate.

Such an automobile manufacturer having their enterprise data 205 residing within the multi-tenant database system as hosted organization data 235 is enabled to share their enterprise data 205 amongst the different dealerships without having to replicate their data or implement their own complex database system and network. For instance, through use of the described methodologies, the automobile manufacturer is able to utilize a CRM system which permits the various dealers to continue their present business practices, yet, at the same time, enables the dealers to benefit from data access to the enterprise data 205 of the automobile manufacturer as well as interact with data of the remaining dealerships making up the dealer network, assuming the automobile manufacturer permits write back access for at least some scope of database records associated with the respective dealers.

Such a structure would therefore enable the automobile manufacturer and the dealers making up the automobile manufacturer's dealer network to engage in more effective lead sharing as well as sharing of common procedures, parts, pricing, sources, and whatever other aspects of the business are capable of re-use.

Other business structures may similarly benefit from the use of the cross-organizational data sharing methodologies described herein. Data.com hosts hundreds of millions of records and tens of millions of accounts. Depending on the subscription level, different accounts have varying access to the same underlying dataset. By creating different hosted organization objects with varying access to the underlying dataset it is possible to efficiently manage such a large number of accounts and contacts without having to replicate the various contacts over and over again on behalf of the different accounts granted access to such data.

For instance, the cross-organizational data sharing structure permits the data to be hosted rather than merely hosting or tracking updates to such data. The granularity of sharing at the object level is therefore well suited to such an application since updates may be additionally be retrieved by other spokes and merged into the respective spoke organizations' account and contact data if they prefer to do so.

Packaging functionality may additionally be utilized to handle releases in support of the cross-organizational data sharing. For instance, custom object definitions may be expanded to handle cross-organizational data sharing object definitions, profiles, permissions, and roles to manage data sharing amongst participating customer organizations.

Records shared via a hub by any individual organization may be subjected to access controls on a per-spoke basis or may have common access controls applied to multiple such spokes, at the discretion of the sharing org. For instance, access controls may be "CRUD" controlled access rights including, for example, CREATE calls (e.g., insert), READ-ONLY access, UPDATE calls, and DELETE statements, in which access rights may be configured at the discretion of an administrator enabling cross-organizational data sharing for a particular hosted organization's data.

Where CREATE calls (e.g., record insertion into a dataset) is permitted according to the access rights it is possible for users at the spokes to write back data into the hosted customer organization's dataset which may then in turn be viewed by other spokes. In other embodiments, write back is permitted but into a record set viewable by the hub and the spoke performing the write-back, but not viewable by other spokes. In such a way, a spoke can write back data for the hosted customer organization to view and utilize but not require the spoke user to expose their data to other spokes where such sharing may not be appropriate. For instance, returning to the dealership example above, individual dealerships may not wish to share their sales numbers with other dealerships, though they may be required or incentivized to share such information with the automobile manufacturer.

Regardless, using the hub and spoke model, it is possible to write the data to a database once and then manipulate what entities are able to share, view, update, and delete the data without necessitating that such data be replicated across many instances.

In certain embodiments, view, write, update, and delete transactions are traceable to a particular individual user at a specific spoke where it is necessary to have such accounting.

In certain embodiments, data created by spokes are owned by the spoke organizations. In other embodiments, once data is shared by a spoke org (e.g., via a write-back from a spoke to the hub) the hub becomes the owner of the data. While the spoke may retain certain access rights to the data written-back to the hub, such access rights are at the discretion of the hub's administrator on behalf of the hosted customer organization and may therefore be modified or terminated, notwithstanding the fact that the data originated at a spoke.

Triggers may additionally be set based on various events, including view, write, update, and delete transactions. For instance, triggers may be utilized to notify a hub owner or administrator of such transactions, cause notifications to be written to Chatter®, trigger emails, SMS message events, and so forth. Foreign key references to the shared objects from a spoke organization's custom objects or custom fields of standard objects may additionally be utilized to support the running of reports and linking objects and records.

FIG. 3A depicts another exemplary architecture 300 in accordance with described embodiments. In particular, a patient survey application 399 is enabled on behalf of hospital organizations, for instance, those customer organizations that operate hospitals as their business.

Such a hospital organization may choose to create and perform patient surveys to improve their business operations, for instance, by identifying those areas considered to need improvement according to their user base, such as the patients 311 depicted here. According to such a structure and embodiment, the patients 311 are enabled to take a survey 324, potentially unauthenticated if so desired by the survey designer and hospital administrators 336. The patients 311 access the patient survey application 399 via a patient survey portal API 310 which in turn is linked with the hosted patient survey application 315 which includes functionality to present a user interface populated based on the hosted organization's data 320 which includes, for example, the question bank and question configuration 321, a collection mechanism to capture the survey responses 322 as entered by the patients 311 taking such a survey, and additionally includes a reports 323 capability, for instance, to render aggregated information based upon the various surveys completed by the patients 311.

The individual organization may operate multiple such hospitals in which case it may be preferable for the organization to provide hosted organization data and objects 340 which include multiple hosted organization objects 330 and multiple hosted organization data 325 elements. For instance, the hosted organization's data and objects 340 would operate as a hub and the multiple hosted organization objects 330 and multiple hosted organization data 325 elements operating as spokes, each segmented from one another according to the access rights controls and dataset exposure as described previously.

The admin API 335 enables the hospital administrators 336 to access the results of the survey, control distribution of the survey, control which spoke organizations can view and access what portions of the hosted organization's data and objects 340, and so forth.

Figure 3B:
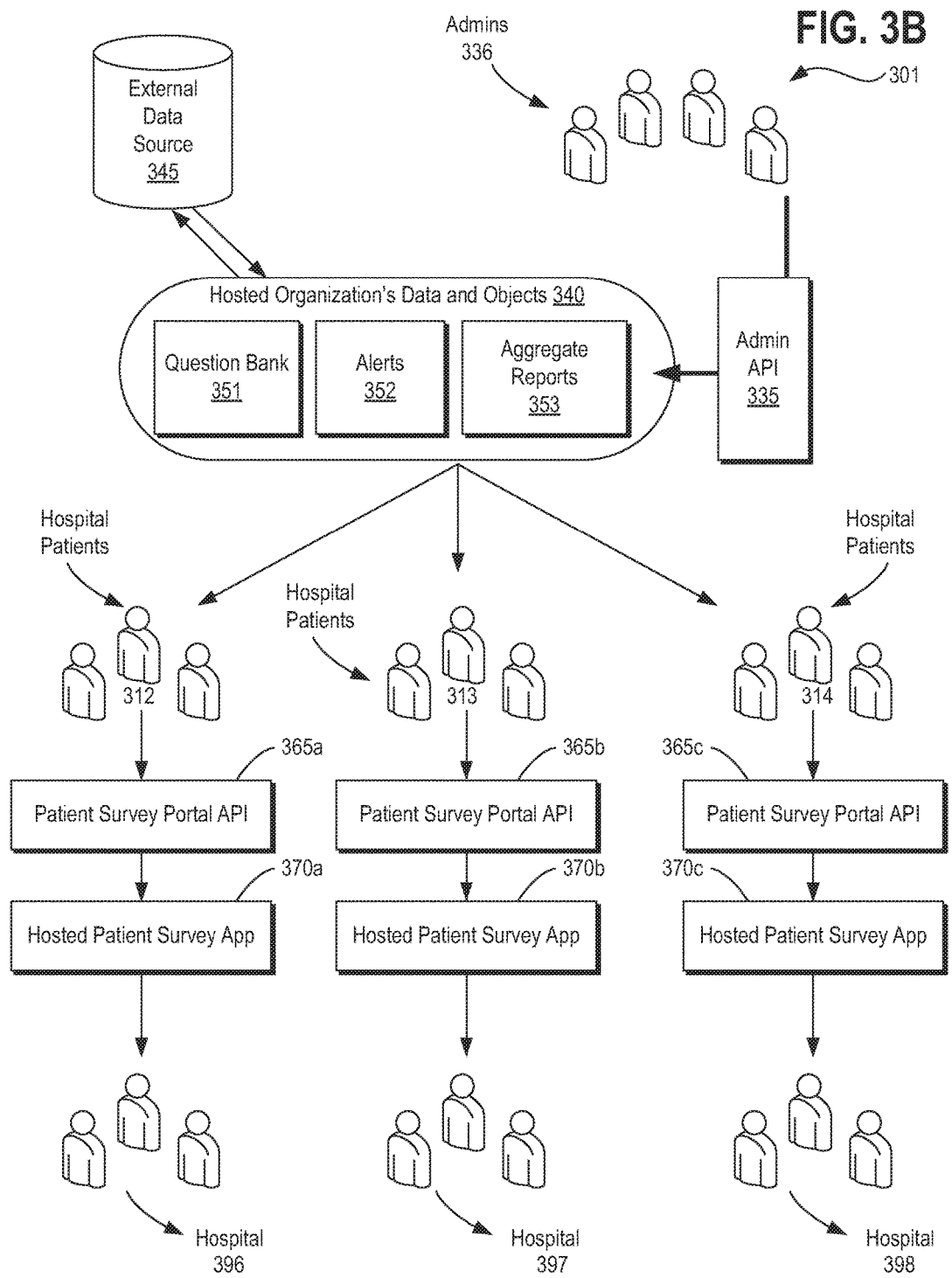
FIG. 3B depicts another exemplary architecture in accordance with described embodiments.

FIG. 3B depicts another exemplary architecture 301 in accordance with described embodiments. In particular, greater detail is shown with regard to the hosted organization's data and objects 340 when operating as a hub and spoke configuration on behalf of multiple distinct hospitals. Additionally, an external data source 345 is now depicted as providing data into and retrieving data from the hosted organization's data and objects 340. For instance, although not required, it is possible to pull the elements necessary for the survey, such as the question bank 351 from the external data source 345 or to write information back to the external data source 345 regarding the survey, such as pushing alerts 352 (e.g., to email, Chatter®, SMS, external UIs, etc.) as well as sending aggregate reports 353 to the external data source 345. As before, such information may also be accessed via the admin API 335, for instance, by the hospital administrators 336, as shown.

As depicted here, the hosted organization's data and objects 340 operate in hub-spoke configuration on behalf of the multiple hospitals 396, 397, and 398 which serve the hospital patients 312, 313, and 314 respectively.

Although there is only one single hub, the hosted organization's data and objects 340, each of the multiple hospitals 396, 397, and 398 and their respective hospital patients 312, 313, and 314 are provided with distinct survey experiences through the various spoke objects. For instance, hospital 396 and hospital patients 312 utilize the patient survey portal API 365a and the hosted patient survey application 370a, whereas hospital 397 and hospital patients 313 utilize the patient survey portal API 365b and the hosted patient survey application 370b, and finally hospital 397 and hospital patients 313 utilize the patient survey portal API 365c and the hosted patient survey application 370c. Each of the respective patient survey portal APIs 365a-c and hosted patient survey applications 370a-c are enabled to operate as though they are wholly independent, yet benefit from the shared information (such as the shared question bank 351) as provided by the hosted organization's data and objects 340 which operates as the hub. Further still, distinct results collected by the respective hosted patient survey applications 370a-c may be written back into the hosted organization's data and objects 340 and utilized in the creation of alerts 352 and aggregate reports 353.

Figure 4A:
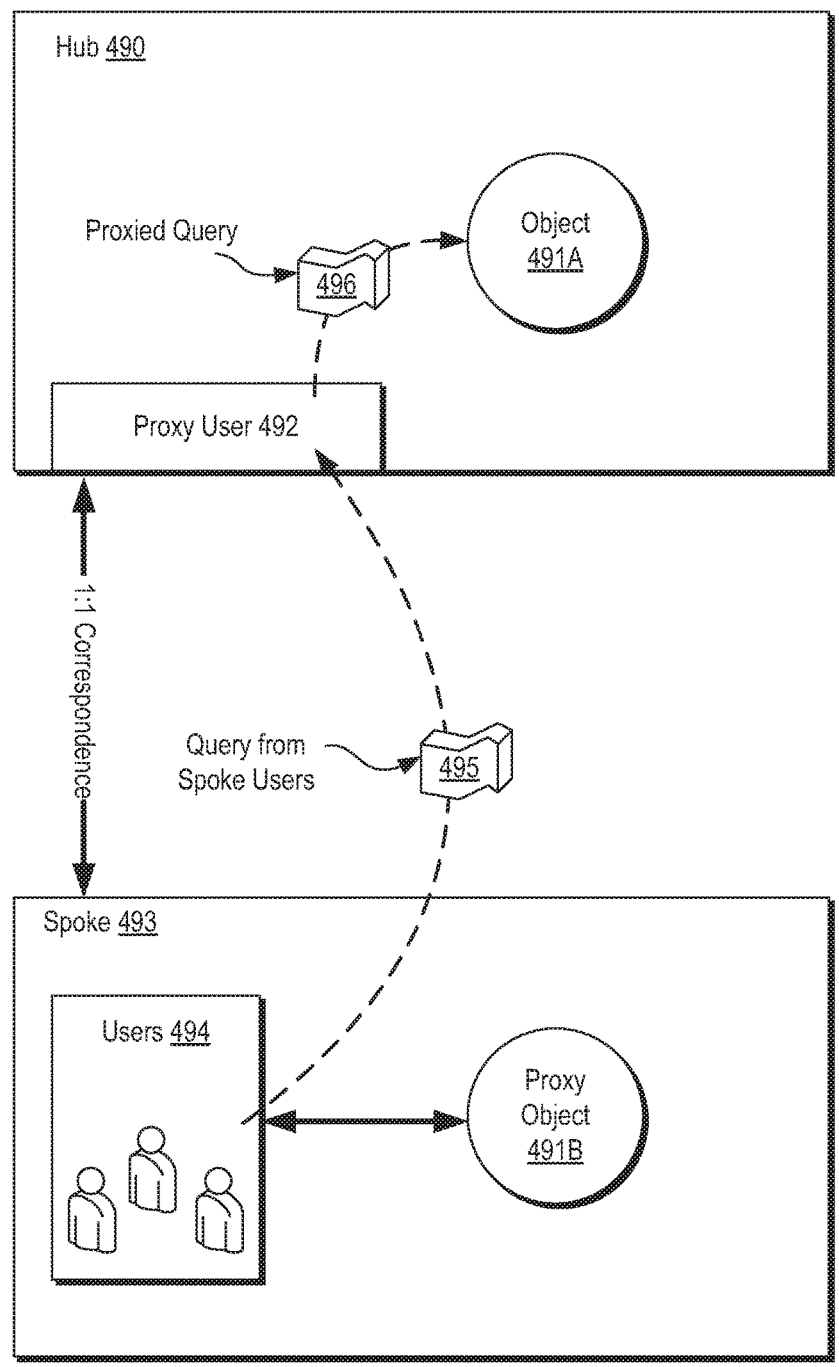
FIG. 4A depicts an exemplary architecture of a hub and spoke in accordance with described embodiments.

FIG. 4A depicts an exemplary architecture 400 of a hub 490 and spoke 493 in accordance with described embodiments. In the simplest architecture, there is at least a hub 490 having hosted data of a customer organization shared via object 491A. Each spoke 493 has a 1:1 correspondence to a proxy user 492 which resides within the hub 490 and possesses the appropriate access rights to query and access the object 491A on behalf of the users 494. Where there are multiple spokes there will additionally be multiple proxy users. The object 491A is where shared data actually resides and where the shared data is queried and accessed. From the perspective of the users 494, it may appear as though the proxy object 491B is being queried. However, the object 491A is not replicated or copied to the spoke 493, but rather, when the users 494 at the spoke 493 wish to query the data of the object 491A they do so by issuing a query which is passed to the proxy user 492 at the hub 490. As depicted here, a query 495 from the spoke users is issued to the proxy user 492 at the hub 490 which then transmits the proxied query 496 to the object 491A which corresponds to the data as stored by the database.

It is beneficial to cause the proxy object 491B to appear as a normal object to the users 494 which resides local to their spoke 493 as such a structure enables the users 494 to utilize regular queries. Therefore, existing tools, APIs, interfaces, and protocols may be utilized and it is not necessary for the users themselves to understand how the query 495 is routed or where the data resides. The described hub 490 and spoke 493 model thus enables the users 494 to benefit from shared access to the customer organization's hosted data at the hub 490 and specifically within the object 491A without requiring data replication or synchronization.

Figure 4B:
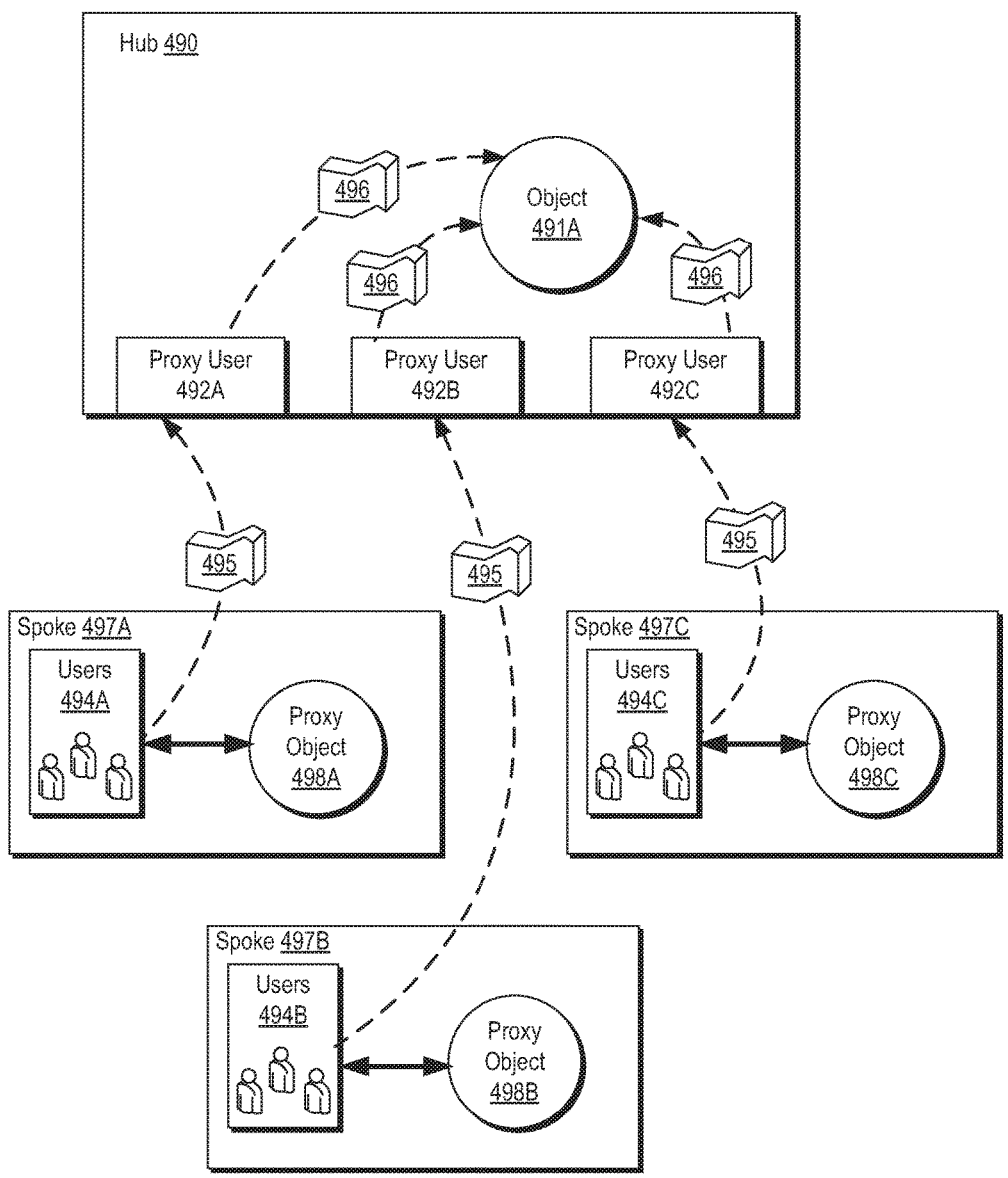
FIG. 4B depicts an exemplary architecture of a hub and multiple spokes in accordance with described embodiments.

FIG. 4B depicts an exemplary architecture 401 of a hub 490 and multiple spokes 497A, 497B, and 497C in accordance with described embodiments. Depicted here is the identical hub 490 and its object 491A, however, there are now three spokes 497A, 497B, and 497C having access to the shared data of the hub 490 via their respective proxy objects 498A, 498B, and 498C on behalf of the respective users 494A, 494B, and 494C. As is readily apparent, each spoke 497A, 497B, and 497C has a 1:1 correspondence to a proxy user 492A, 492B, and 492C respectively, each residing at the hub 490 and having appropriate access rights by which to query and access the object 491A at the hub actually having the data therein. As before, queries 495 will be passed to the corresponding proxy user 492A-C for the respective spoke 497A-C which in turn operates to actually query the object 491A at the hub 490 on behalf of the spoke 497A, 497B, and 497C having initiated the query 495.

Multiple distinct objects may be exposed at the hub 490 and many more spokes may exist than those depicted here. Additionally, distinct customer organizations having their data hosted at the multi-tenant database system would be represented by different hubs and in turn share their data to different spokes.

According to one embodiment there is a "Broadcast" capability which enables a read-only remote access configuration for the customer organization sharing their data. For instance, such a broadcast capability will establish initial connections between the Hub and Spokes and enable hub administrators to manage sharing of data to chosen spokes as well as broadcast shared data from the hub with read-only access rights to the users of the spokes.

Figure 4C:
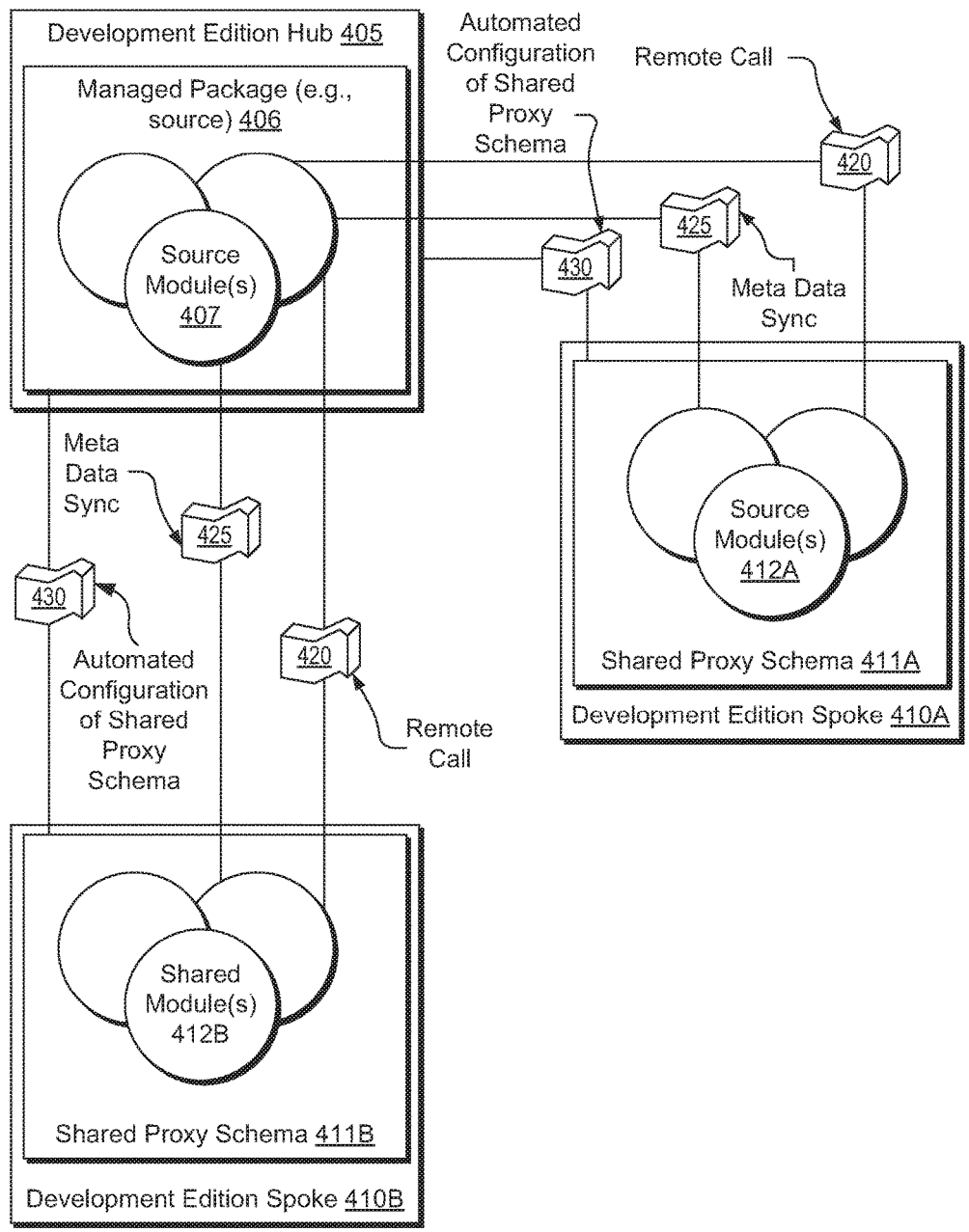
FIG. 4C depicts an exemplary development phase architecture in accordance with described embodiments.

FIG. 4C depicts an exemplary development phase architecture 402 in accordance with described embodiments. In particular, there is depicted a development edition hub 405 having therein a managed package 406 (e.g., source) with multiple source modules 407. The development edition hub 405 interfaces in turn with multiple spokes, in particular, development edition hub 405 interfaces to development edition spoke 410A having shared proxy schema 411A therein which includes source modules 412A and development edition hub 405 additionally interfaces to development edition spoke 410B having shared proxy schema 411B therein which includes source modules 412B.

The development phase architecture 402 provides the ability to build the respective hub and spoke(s) through which cross-organizational data will be shared by any respective customer organization. This includes initial connection setup, support of packaging, sharing control, remote object access mechanism, error/exception handling, latency tolerance, etc. Such functionality enables the customer organization to configure their sharing in the manner appropriate for their particular business needs.

During a development phase, development organizations seeking to share their data are able to define hubs and spokes internal to their organization. After such definition, they may perform connection setup functions to establish communication paths between hubs and spokes. Such configurations may be shared as a schema, for instance, as depicted by element 430 where automated configuration of shared proxy schema information is being shared from the development edition hub 405 to each of the development edition spokes 410A and 410B.

Meta data sync 425 depicts the development edition hub 405 additionally synching its metadata to each of the respective development edition spokes 410A and 410B in support of enabling the desired sharing by the hub. Lastly, remote calls 420 may be issued by the development edition hub 405 to each of the development edition spokes 410A and 410B.

Figure 4D:
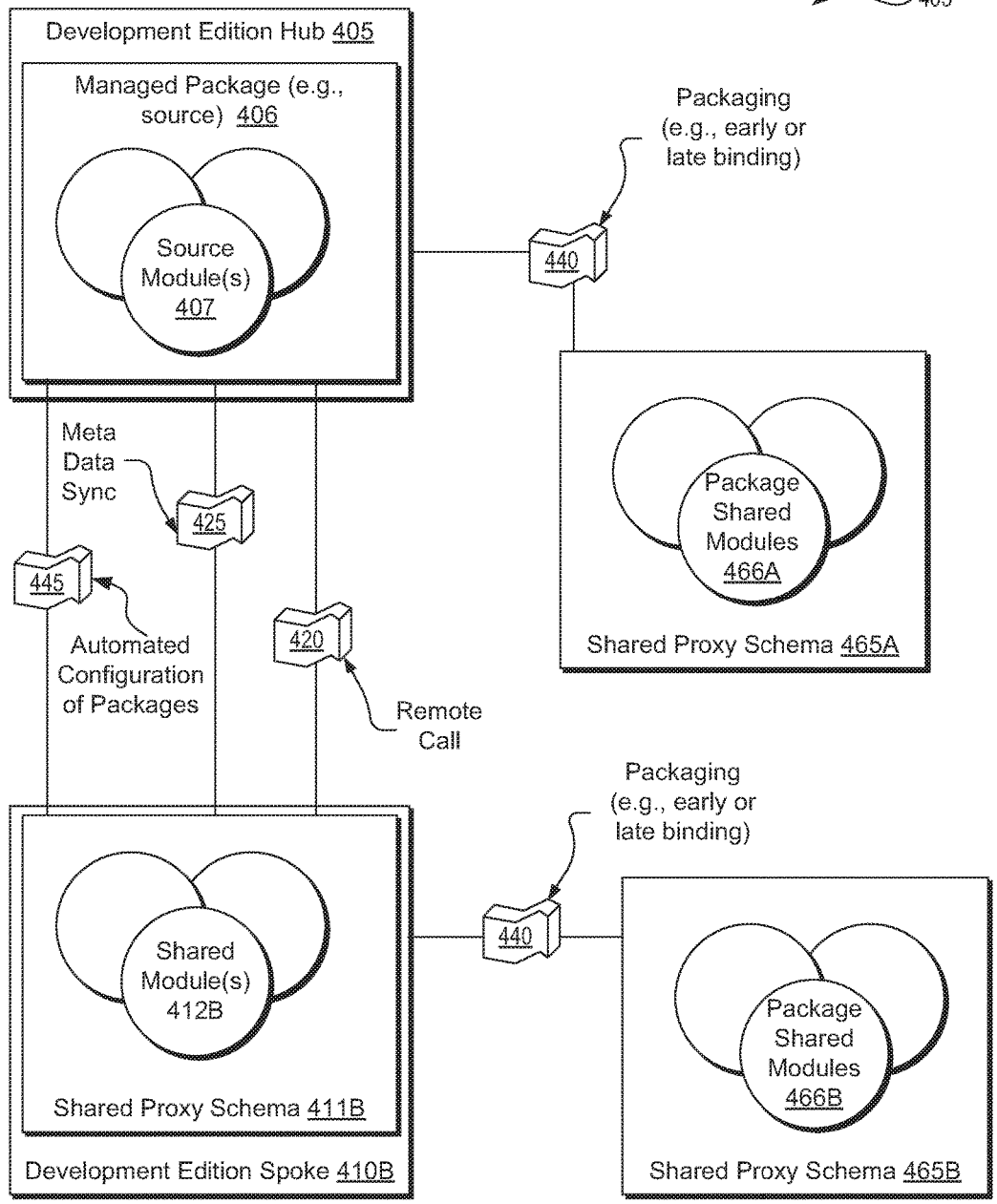
FIG. 4D depicts an exemplary packaging phase architecture in accordance with described embodiments.

FIG. 4D depicts an exemplary packaging phase architecture 403 in accordance with described embodiments. As before, there is depicted a development edition hub 405 having therein a managed package 406 (e.g., source) with multiple source modules 407. The development edition hub 405 interfaces in turn with development edition spoke 410B having shared proxy schema 411B therein which includes source modules 412B. The development edition spoke 410B in turn interfaces to shared proxy schema 465B which includes package shared modules 466B. Development edition hub 405 additionally interfaces to shared proxy schema 465A and its package shared modules 466A. Similar to before, meta data sync 425 depicts the development edition hub 405 synching its metadata to development edition spoke 410A and remote call 420 may be issued by the development edition hub 405 to the development edition spoke 410A.

Development edition hub 405 may now also issue automated configuration of packages 445 to the development edition spoke 410B or early/late binding packaging 440 to shared proxy schema 465A directly or indirectly to shared proxy schema 465B through development edition spoke 410B which itself issues the early/late binding packaging 440 directly to shared proxy schema 465B.

Via the packaging phase architecture 403 both development edition hub 405 and the development edition spoke 410B are therefore capable of independently packaging cross-organizational sharing definitions and logics. The hub deployment packaging option of early and late binding may be provided during a packaging stage as shown, in which early binding enables spokes to be "bound" to the hub before either the hub or its dependent spoke to which information will be shared is deployed. Thus, the sharing scheme is established and packaged in advanced without being made live in the production environment. When early binding is utilized, the development edition hub 405 may store the deployment hub org and its administrative user information in its development edition shared proxy schema 465A and 465B. One deployment hub may be pre-configured and then deployed automatically to a pre-determined production hub to operate in the live production environment.

During the development spoke deployment process, early binding of the hub may further allow "silent" spoke deployment without asking a spoke administrator to provide the hub information, thus enabling a fully automated installation which may be used to simplify deployment of a large number of spokes into production.

Late binding conversely enables hub and spoke packages to be deployed to any organization with a required set of permissions. For instance, the hub package can be deployed to as many production orgs as needed. Since a deployment hub's corresponding customer organization is unknown at packaging time, spoke package deployment may subsequently supply the deployment hub to which the spoke is to be connected.

Upon activation, administrators may be displayed a data management UI in which they can add or remove shared data and also manipulate access rights and restrictions for the sharing. New connections from the hub to permitted spokes may additionally be enabled through such a UI. Where a pre-packaged shared proxy schema 465A-B is utilized, such features may be pre-configured and appropriately enabled at activation of the hub in the live production environment.

In certain embodiments multiple different cross-org sharing packages can be installed into the same customer organization resulting in a single organization hosting multiple hubs, each with a different shared proxy schemas 465A-B.

Versioning of the shared proxy schemas 465A-B enables management of hub/spoke sharing configurations using major and minor versions at the discretion of the hub administrator via an associated major and minor version number independent from the package version. Version management may be automated on behalf of users such that actions such as removing a field, or changing a field's sharing attributes causes a version number to be increased. Backward compatible changes made to the schema like adding a field may cause a minor schema version number to be incremented while more significant changes such as a change in access rights may trigger a major version change. When spokes with different major schema version attempt to access a hub, the connection may be invalidated as policy requiring the spoke proxy to be refreshed. Alternatively, a hub may maintain a list or range of permissible down-rev versions.

Orgs may fork their Hub/Spoke packages or merge patches onto a trunk. Orgs may additionally share developed Hub/Spoke packages and schemas.

Figure 5:
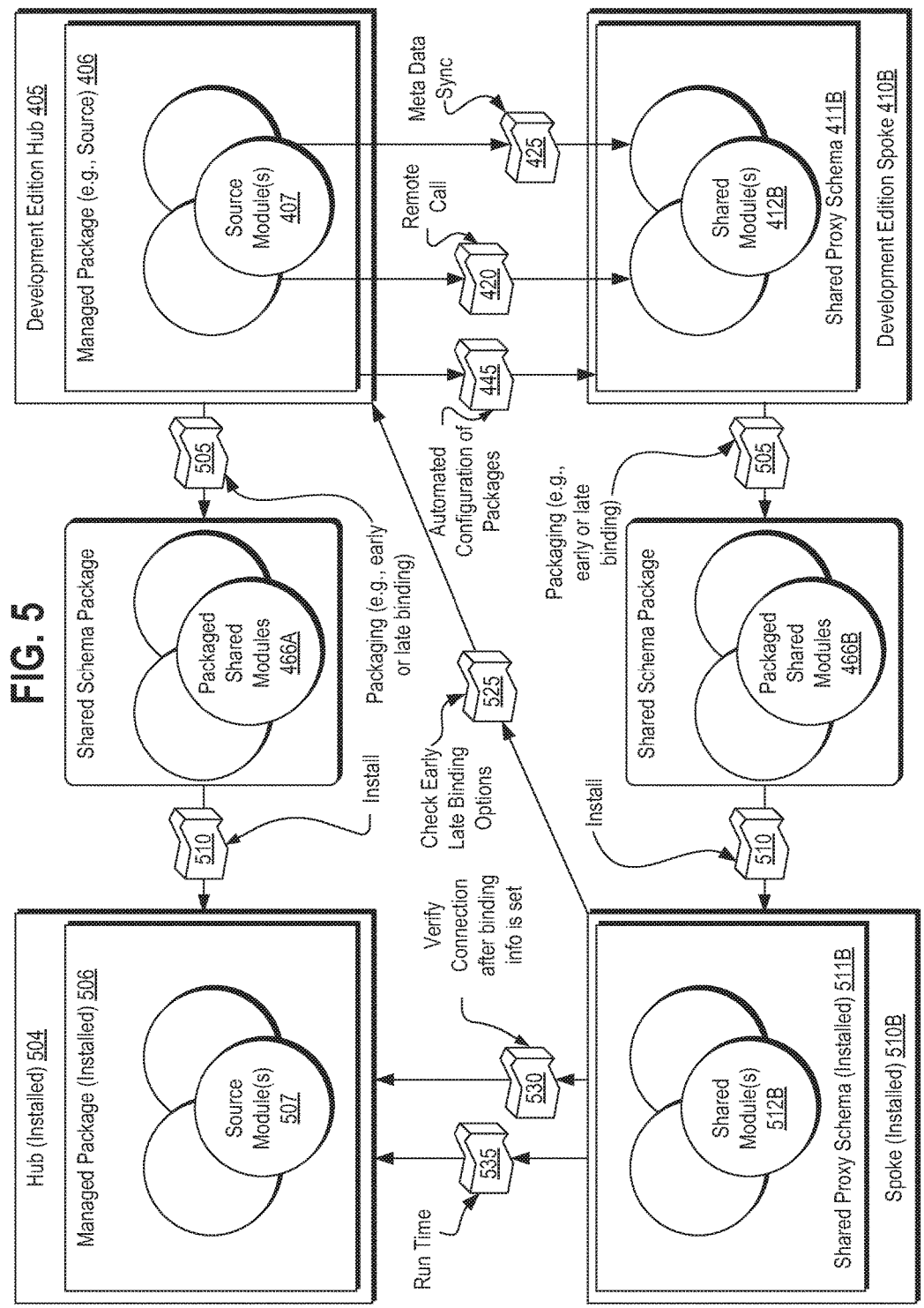
FIG. 5 depicts an exemplary installation and activation phase architecture in accordance with described embodiments.

FIG. 5 depicts an exemplary installation and activation phase architecture in accordance with described embodiments. In particular, there is depicted at the upper right a development edition hub 405. Via early or late binding packaging 505 a shared schema package and its packaged shared modules 466A are deployed for installation and installed at 510 resulting in the hub 504 being installed and the managed package 506 being installed with its source modules 507, as is depicted at the upper left.

The development edition hub 405 at the upper right additionally performs the automated configuration of packages 445, meta data sync 425, and remote call 420 as described previously resulting in the development edition spoke 410B and its shared proxy schema 411B and shared modules 412B being deployed. Via early or late binding packaging 505 the shared schema package and its packaged shared modules 466B are then installed 510 resulting in the spoke 510B being installed in addition to its shared proxy schema 511B being installed with its shared modules 512B.

At run time 535 the spoke 510B, now installed, checks the early/late binding options as indicated by 525 and then verifies its connection after the binding information is set as indicated by element 530, thus resulting in a complete deployment and installation of the hub and spoke architecture into a live production environment (e.g., such as at a multi-tenant database system) in support of the cross organization data sharing for a customer organization.

Figure 6:
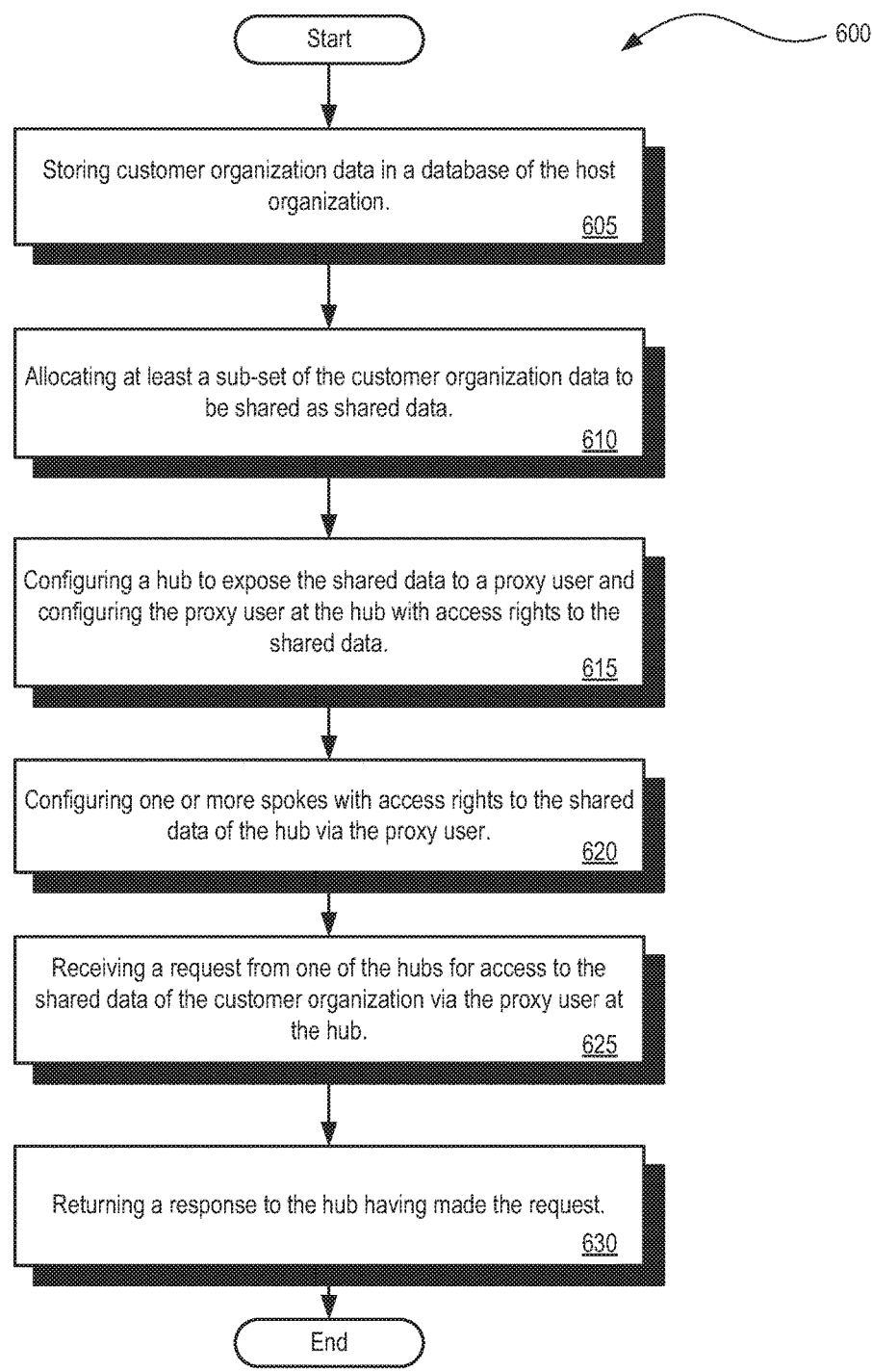
FIG. 6 is a flow diagram illustrating a method for implementing cross organizational data sharing in accordance with disclosed embodiments.

FIG. 6 is a flow diagram illustrating a method 600 for implementing cross organizational data sharing in accordance with disclosed embodiments. Method 600 may be performed by processing logic that may include hardware (e.g., circuitry, dedicated logic, programmable logic, microcode, etc.), software (e.g., instructions run on a processing device to perform various operations such as storing, allocating, displaying, communicating, receiving, updating, applying, filtering, committing, querying, executing, generating, capturing, exposing, transmitting, sending, returning, etc., in pursuance of the systems, apparatuses, and methods for implementing cross organizational data sharing, as described herein. For example, the computing architecture (e.g., within production environment 111) of host organization 110 as depicted at FIG. 1, machine 800 at FIG. 8, or the system 900 at FIG. 9, may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 605, processing logic stores customer organization data in a database of the host organization.

At block 610, processing logic allocates at least a sub-set of the customer organization data to be shared as shared data.

At block 615, processing logic configures a hub to expose the shared data to a proxy user and configures the proxy user at the hub with access rights to the shared data.

At block 620, processing logic configures one or more spokes with access rights to the shared data of the hub via the proxy user.

At block 625, processing logic receives a request from one of the hubs for access to the shared data of the customer organization via the proxy user at the hub.

At block 630, processing logic returns a response to the hub having made the request.

According to another embodiment of method 600, configuring the hub to expose the shared data to a proxy user and configuring the proxy user at the hub with access rights to the shared data includes configuring the proxy with access rights to the customer organization data stored in the database of the host organization without replicating the exposed shared data.

According to another embodiment of method 600, configuring the hub to expose the shared data to a proxy user includes allocating the shared data to an object at the hub and configuring the proxy user with access rights to the object.

According to another embodiment of method 600, the sub-set of the customer organization data to be shared includes one or more queryable objects stored at the database of the host organization; and in which the proxy user at the hub is configured to query the one or more queryable objects stored at the database without replicating the one or more queryable objects.

According to another embodiment of method 600, configuring the one or more spokes with access rights to the shared data of the hub via the proxy user includes configuring each of the one or more spokes with a queryable proxy object void of the shared data; in which the queryable proxy object is configured to proxy any received query to a corresponding proxy user at the hub; and in which the corresponding proxy user at the hub is configured to query the one or more queryable objects stored at the database responsive to the proxied query from the spoke.

According to another embodiment of method 600, configuring a hub to expose the shared data to a proxy user and configuring the proxy user at the hub with access rights to the shared data includes configuring the proxy user with one or more of the following access rights to the shared data: read-only access to the shared data; write, update, and modify access to the shared data; delete capability of database records within the shared data; create and record insertion capability to introduce new database records into the shared data.

According to another embodiment of method 600, configuring the hub to expose the shared data to a proxy user and configuring the proxy user at the hub with access rights to the shared data includes configuring the hub as a broadcast hub, in which the shared data is exposed to the one or more spokes with read-only access for the shared data and no capability to update, modify, insert, or delete database records within the shared data.

According to another embodiment of method 600, configuring the hub to expose the shared data to a proxy user and configuring the proxy user at the hub with access rights to the shared data includes configuring the hub with selective write-back capability, in which the shared data is exposed to the one or more spokes with read-only access for the shared data via a first queryable object and no capability to update, modify, insert, or delete database records within the first queryable object and further in which a second queryable object is exposed to the one or more spokes with create and record insertion capability to introduce new database records into the shared data via the second queryable object.

According to another embodiment of method 600, returning the response to the hub having made the request includes: querying the shared data stored in the database of the host organization via the proxy user at the hub; and returning query results to the spoke having initiated the request responsive to the request.

According to another embodiment, method 600 further includes: storing the configuration of the hub, the configuration of the one or more spokes, and the configuration of the proxy user and its access rights to the shared data via a proxy schema.

According to another embodiment, method 600 further includes: packaging and deploying the proxy schema into a live production environment; and installing the hub and the one or more spokes within the live production environment according to the stored configuration of the hub, the stored configuration of the one or more spokes, and the stored configuration of the proxy user and its access rights to the shared data as represented by the packaged and deployed proxy schema.

According to another embodiment of method 600, allocating at least the sub-set of the customer organization data to be shared as shared data includes at least one of: sharing one or more database tables as the shared data; sharing a plurality of database records as the shared data; sharing access to one or more database fields as the shared data; sharing access to one or more queryable database objects as the shared data; and sharing access to executable code, reports, or user interfaces as the shared data.

According to another embodiment of method 600, a user interface operates at a user client device remote from the host organization and communicatively interfaces with the host organization via a public Internet; in which the host organization operates as a cloud based service provider to the user client device; and in which the request is received at the host organization from the user client device.

According to another embodiment of method 600, the database of the host organization includes a multi-tenant database system having elements of hardware and software that are shared by a plurality of separate and distinct customer organizations, each of the separate and distinct customer organizations being remotely located from the host organization; and in which each customer organization is an entity selected from the group consisting of: a separate and distinct remote organization, an organizational group within the host organization, a business partner of the host organization, or a customer organization that subscribes to cloud computing services provided by the host organization.

According to a particular embodiment, there is non-transitory computer readable storage media having instructions stored thereon that, when executed by a processor in a host organization, the instructions cause the host organization to perform operations including: storing customer organization data in a database of the host organization; allocating at least a sub-set of the customer organization data to be shared as shared data; configuring a hub to expose the shared data to a proxy user and configuring the proxy user at the hub with access rights to the shared data; configuring one or more spokes with access rights to the shared data of the hub via the proxy user; receiving a request from one of the hubs for access to the shared data of the customer organization via the proxy user at the hub; and returning a response to the hub having made the request.

Figure 7A:
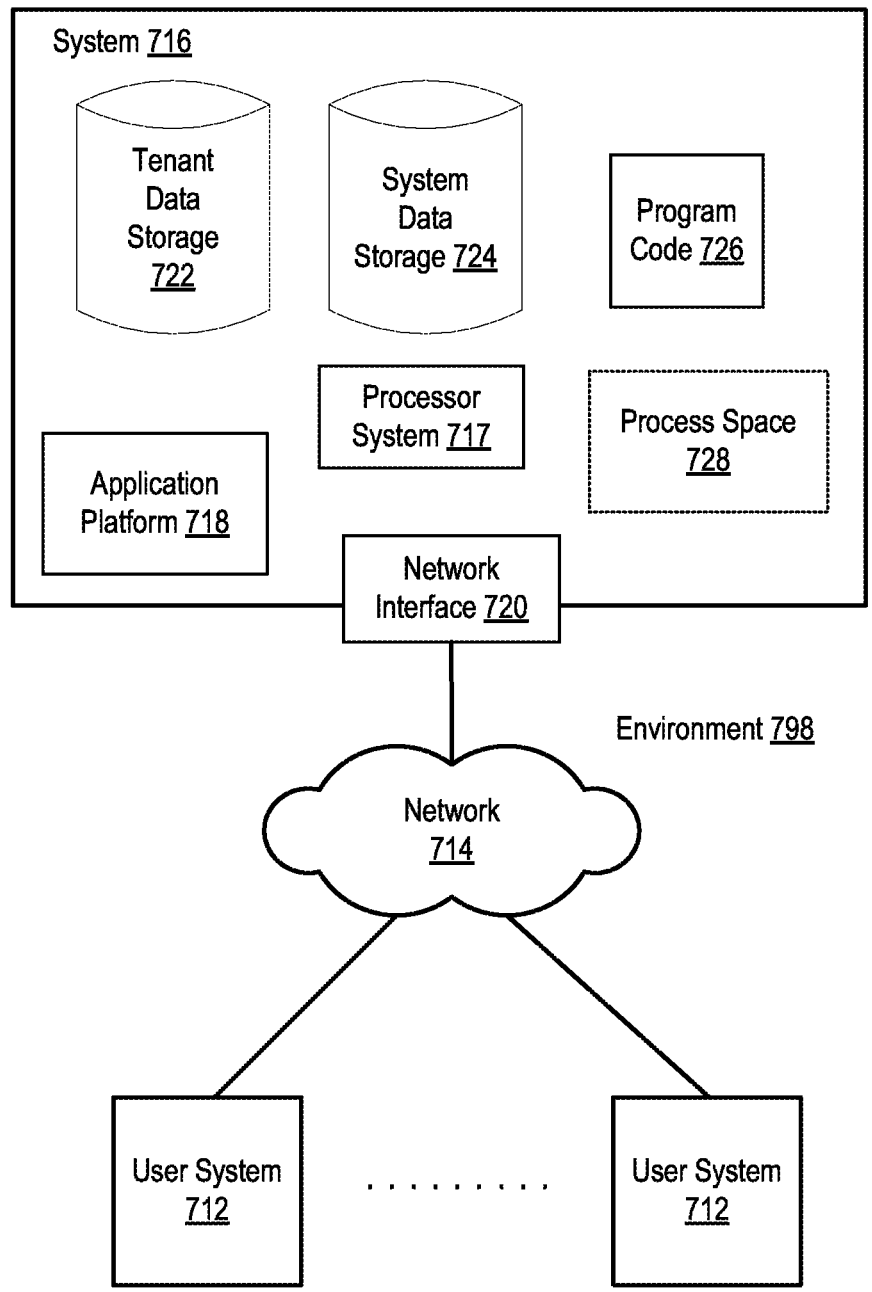
FIG. 7A illustrates a block diagram of an environment in which an on-demand database service may operate in accordance with the described embodiments.

FIG. 7A illustrates a block diagram of an environment 798 in which an on-demand database service may operate in accordance with the described embodiments. Environment 798 may include user systems 712, network 714, system 716, processor system 717, application platform 718, network interface 720, tenant data storage 722, system data storage 724, program code 726, and process space 728. In other embodiments, environment 798 may not have all of the components listed and/or may have other elements instead of, or in addition to, those listed above.

Environment 798 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7A (and in more detail in FIG. 7B) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" is used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7A, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7A, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7A include conventional, well-known elements that are explained only briefly here. For example, each user system 712 may include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units.

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7B:
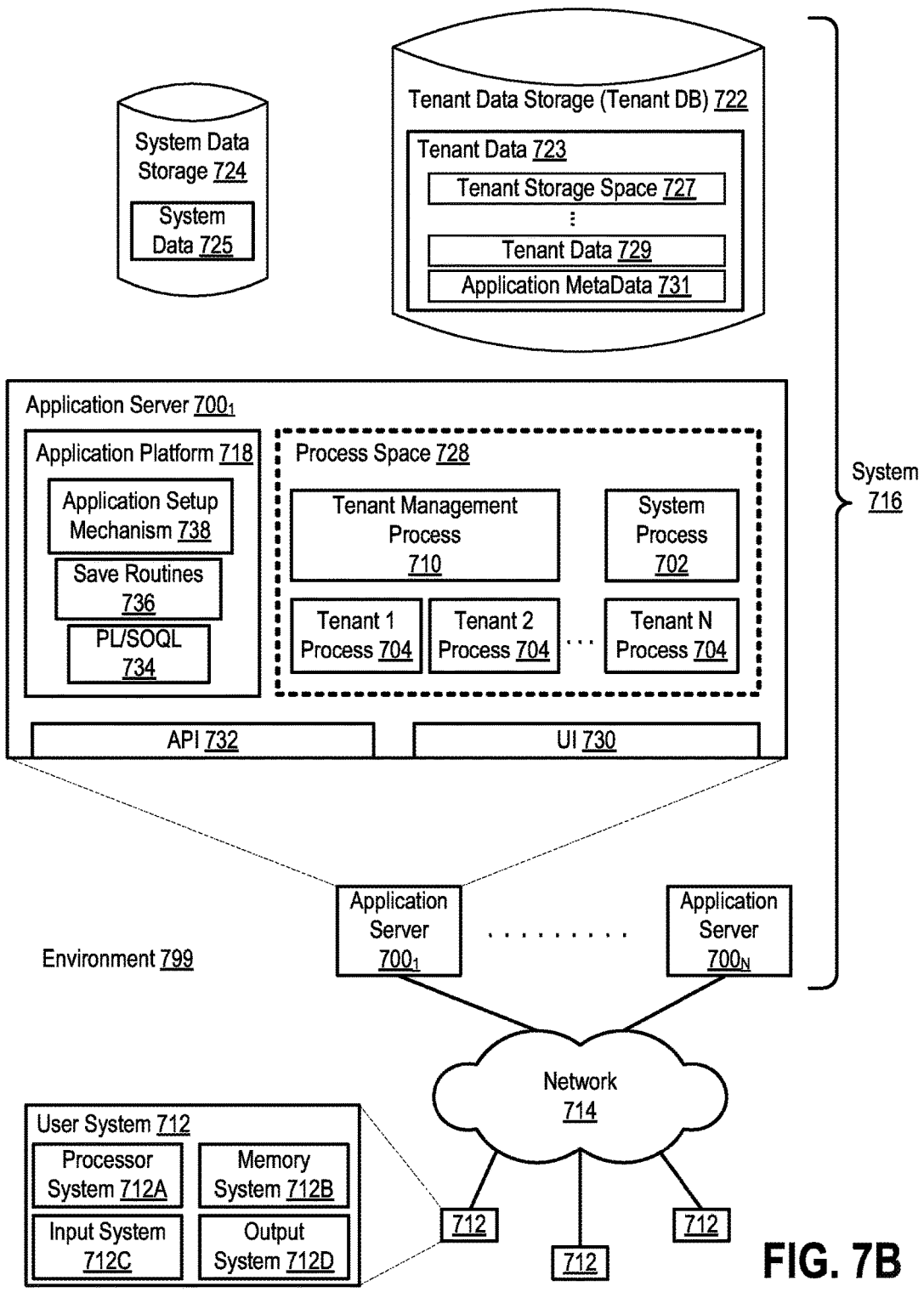
FIG. 7B illustrates another block diagram of an embodiment of elements of FIG. 7A and various possible interconnections between such elements in accordance with the described embodiments.

FIG. 7B illustrates another block diagram of an embodiment of elements of FIG. 7A and various possible interconnections between such elements in accordance with the described embodiments. FIG. 7B also illustrates environment 799. However, in FIG. 7B, the elements of system 716 and various interconnections in an embodiment are illustrated in further detail. More particularly, FIG. 7B shows that user system 712 may include a processor system 712A, memory system 712B, input system 712C, and output system 712D. FIG. 7B shows network 714 and system 716. FIG. 7B also shows that system 716 may include tenant data storage 722, having therein tenant data 723, which includes, for example, tenant storage space 727, tenant data 729, and application metadata 731. System data storage 724 is depicted as having therein system data 725. Further depicted within the expanded detail of application servers $700_{1-N}$ are User Interface (UI) 730, Application Program Interface (API) 732, application platform 718 includes PL/SOQL 734, save routines 736, application setup mechanism 738, process space 728 includes system process space 702, tenant 1-N process spaces 704, and tenant management process space 710. In other embodiments, environment 799 may not have the same elements as those listed above and/or may have other elements instead of, or in addition to, those listed above.

User system 712, network 714, system 716, tenant data storage 722, and system data storage 724 were discussed above in FIG. 7A. As shown by FIG. 7B, system 716 may include a network interface 720 (of FIG. 7A) implemented as a set of HTTP application servers 700, an application platform 718, tenant data storage 722, and system data storage 724. Also shown is system process space 702, including individual tenant process spaces 704 and a tenant management process space 710. Each application server 700 may be configured to tenant data storage 722 and the tenant data 723 therein, and system data storage 724 and the system data 725 therein to serve requests of user systems 712. The tenant data 723 might be divided into individual tenant storage areas (e.g., tenant storage space 727), which can be either a physical arrangement and/or a logical arrangement of data. Within each tenant storage space 727, tenant data 729, and application metadata 731 might be similarly allocated for each user. For example, a copy of a user's most recently used (MRU) items might be stored to tenant data 729. Similarly, a copy of MRU items for an entire organization that is a tenant might be stored to tenant storage area 727. A UI 730 provides a user interface and an API 732 provides an application programmer interface into system 716 resident processes to users and/or developers at user systems 712. The tenant data and the system data may be stored in various databases, such as one or more Oracle™ databases.

Application platform 718 includes an application setup mechanism 738 that supports application developers' creation and management of applications, which may be saved as metadata into tenant data storage 722 by save routines 736 for execution by subscribers as one or more tenant process spaces 704 managed by tenant management process space 710 for example. Invocations to such applications may be coded using PL/SOQL 734 that provides a programming language style interface extension to API 732. Invocations to applications may be detected by one or more system processes, which manages retrieving application metadata 731 for the subscriber making the invocation and executing the metadata as an application in a virtual machine.

Each application server 700 may be communicably coupled to database systems, e.g., having access to system data 725 and tenant data 723, via a different network connection. For example, one application server $700_1$ might be coupled via the network 714 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 712 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user may hit three different application servers 700, and three requests from different users may hit the same application server 700. In this manner, system 716 is multi-tenant, in which system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 700 to request and update system-level and tenant-level data from system 716 that may require sending one or more queries to tenant data storage 722 and/or system data storage 724. System 716 (e.g., an application server 700 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 8 illustrates a diagrammatic representation of a machine 800 in the exemplary form of a computer system, in accordance with one embodiment, within which a set of instructions, for causing the machine/computer system 800 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 818 (e.g., a persistent storage device including hard disk drives and a persistent database and/or a multi-tenant database implementation), which communicate with each other via a bus 830. Main memory 804 includes customer organization data 824 which may be shared in accordance with the stored configurations established by the schema generator 823 and the sharing configurator 825 which configures hubs and spokes as well as proxy users and applicable access rights to expose the shared data. Main memory 804 and its sub-elements are operable in conjunction with processing logic 826 and processor 802 to perform the methodologies discussed herein. The computer system 800 may additionally or alternatively embody the server side elements as described above.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and functionality which is discussed herein.

The computer system 800 may further include a network interface card 808. The computer system 800 also may include a user interface 810 (such as a video display unit, a liquid crystal display (LCD), or a cathode ray tube (CRT)), an alphanumeric input device 812 (e.g., a keyboard), a cursor control device 814 (e.g., a mouse), and a signal generation device 816 (e.g., an integrated speaker). The computer system 800 may further include peripheral device 836 (e.g., wireless or wired communication devices, memory devices, storage devices, audio processing devices, video processing devices, etc.).

The secondary memory 818 may include a non-transitory machine-readable or computer readable storage medium 831 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface card 808.

Figure 9:
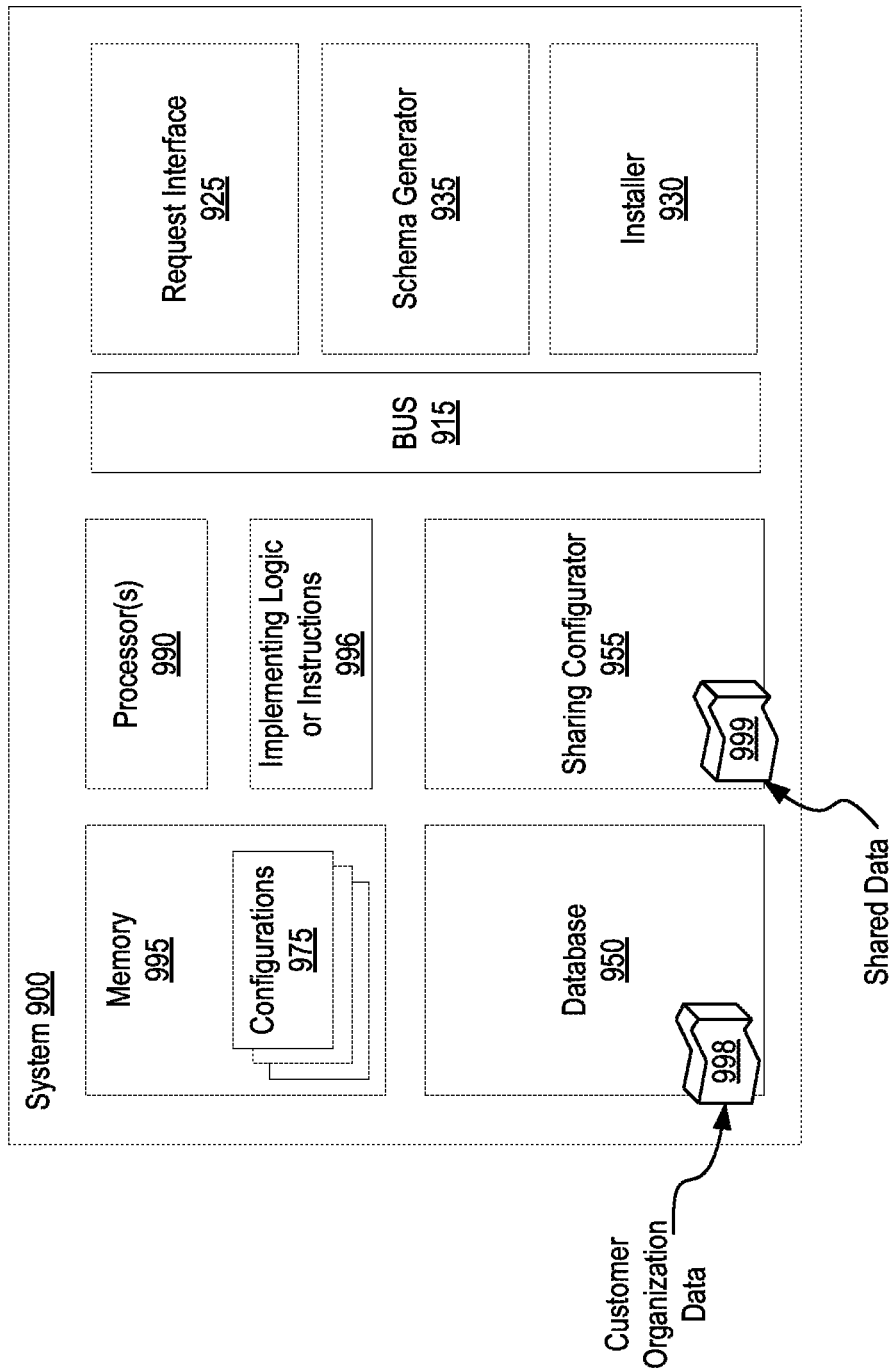
FIG. 9 shows a diagrammatic representation of a system in accordance with which embodiments may operate, be installed, integrated, or configured.

FIG. 9 shows a diagrammatic representation of a system 900 in which embodiments may operate, be installed, integrated, or configured.

In accordance with one embodiment, there is a system 900 having at least a processor 990 and a memory 995 there to execute implementing logic and/or instructions 996. According to such an embodiment, the system 900 further includes a database 950 to store customer organization data 998; a sharing configurator 955 to allocate at least a sub-set of the customer organization data 998 to be shared as shared data 999; the sharing configurator 955 to configure a hub to expose the shared data 999 to a proxy user and to further configure the proxy user at the hub with access rights to the shared data 999; the sharing configurator 955 to configure one or more spokes with access rights to the shared data 999 of the hub via the proxy user; a request interface 925 to receive a request from one of the hubs for access to the shared data 999 of the customer organization via the proxy user at the hub; and the request interface 925 to return a response to the hub having made the request.

According to another embodiment of the system 900, a user interface operates at a user client device remote from the system 900 and communicatively interfaces with the system via a public Internet; in which the system operates at a host organization as a cloud based service provider to the user client device.

According to another embodiment of the system 900, the database 950 comprises a multi-tenant database system having elements of hardware and software that are shared by a plurality of separate and distinct customer organizations, each of the separate and distinct customer organizations being remotely located from the host organization; and in which each customer organization is an entity selected from the group consisting of: a separate and distinct remote organization, an organizational group within the host organization, a business partner of the host organization, or a customer organization that subscribes to cloud computing services provided by the host organization.

According to another embodiment, the system 900 further includes: a schema generator 935 to record the configuration 975 of the hub, the configuration 975 of the one or more spokes, and the configuration 975 of the proxy user and its access rights to the shared data via a proxy schema; and an installer 930 to package and deploy the proxy schema into a live production environment, in which the installer 930 is to install the hub and the one or more spokes within the live production environment according to the stored configuration of the hub, the stored configuration of the one or more spokes, and the stored configuration of the proxy user and its access rights to the shared data as recorded by the packaged and deployed proxy schema.

Bus 915 interfaces the various components of the system 900 amongst each other, with any other peripheral(s) of the system 900, and with external components such as external network elements, other machines, client devices, etc., including communicating with such external devices via a network interface over a LAN, WAN, or the public Internet.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a system having at least a hardware processor and a memory therein, wherein the method comprises:
   storing data in a database system communicably interfaced with the system;
   allocating at least a sub-set of the data to be exposed by the database system shared as shared data, wherein the sub-set of the data includes one or more queryable objects stored at the database system;
   configuring a package for deployment into a production environment, wherein the package includes a pre-configured hub to expose the shared data to a proxy user and one or more pre-configured spokes bound to the pre-configured hub, wherein each of the one or more pre-configured spokes defines access rights to the shared data of the pre-configured hub, via the proxy user, through a queryable proxy object void of the shared data;
   deploying the package into the production environment to activate a hub and one or more spokes within the production environment corresponding to the pre-configured hub and the one or more pre-configured spokes of the package;
   wherein the queryable proxy object is configured to proxy any received query to a corresponding proxy user at the hub and further wherein the corresponding proxy user at the hub is configured to query the one or more queryable objects stored at the database system responsive to the proxied query from the spoke;
   receiving a request from the hub for access to the shared data via the proxy user at the hub; and
   returning a response to the hub having made the request.

2. The method of claim 1, wherein the pre-configured hub to expose the shared data to the proxy user and the one or more pre-configured spokes bound to the pre-configured hub expose the shared data to the proxy user without replicating the exposed shared data in either the hub or the one or more spokes and without replicating any of the one or more queryable objects from the database system to the hub or the one or more spokes.

3. The method of claim 1, wherein configuring the package to be deployed with the pre-configured hub to expose the shared data to the proxy user comprises early binding the one or more spokes to the hub having a pre-configured allocation defined via a shared proxy schema allocating the shared data to an object at the hub granting the proxy user with access rights to the object.

4. The method of claim 1, wherein deploying the package into the production environment, comprises:
   performing a silent deployment of the package into the production environment without requiring requesting any hub information from a spoke administrator during the deployment process to yield a fully automated installation of the package within the production environment.

5. The method of claim 1, wherein configuring a hub to expose the shared data to a proxy user and configuring the proxy user at the hub with access rights to the shared data comprises configuring the proxy user with one or more of the following access rights to the shared data:
   read-only access to the shared data;
   write, update, and modify access to the shared data;
   delete capability of database records within the shared data;
   create and record insertion capability to introduce new database records into the shared data.

6. The method of claim 1, wherein configuring the hub to expose the shared data to a proxy user and configuring the proxy user at the hub with access rights to the shared data comprises configuring the hub as a broadcast hub, wherein the shared data is exposed to the one or more spokes with read-only access for the shared data and no capability to update, modify, insert, or delete database records within the shared data.

7. The method of claim 1, wherein configuring the hub to expose the shared data to a proxy user and configuring the proxy user at the hub with access rights to the shared data comprises configuring the hub with selective write-back capability, wherein the shared data is exposed to the one or more spokes with read-only access for the shared data via a first queryable object and no capability to update, modify, insert, or delete database records within the first queryable object and further wherein a second queryable object is exposed to the one or more spokes with create and record insertion capability to introduce new database records into the shared data via the second queryable object.

8. The method of claim 1, further comprising:
   automatically deploying a plurality of packages to the production environment via a silent spoke deployment operation, wherein each of the plurality of packages defines at least one spoke having been early bound to the hub via pre-configured access rights to the shared data of the hub, via the proxy user, through a queryable proxy object void of the shared data at the hub; and
   wherein automatically deploying the plurality of packages to the production environment via the silent spoke deployment operation completes without requesting any spoke configuration data from a spoke administrator deploying the plurality of packages.

9. The method of claim 1, wherein configuring the package for deployment into a production environment with the pre-configured hub to expose the shared data to a proxy user and the one or more pre-configured spokes bound to the pre-configured hub, comprises performing early binding of the one or more spokes activated within the production environment via the deployment of the package to establish a sharing scheme within the package to be deployed in advance of deploying the package to the production environment and without making the sharing scheme live within the production environment.

10. The method of claim 1, further comprising:
   configuring a second package for deployment into the production environment, wherein the package includes a second pre-configured hub to expose a second sub-set of data to a second proxy user;
   wherein the second package includes late binding of a second hub and spoke combination, wherein the second package is deployable to any customer organization interacting with the database system having a required set of permissions; and
   wherein the customer organizations to which the second package deployable are unknown at the time of packaging of the second package.

11. The method of claim 1, further comprising:
   activating the hub and the one or more spokes within the production environment pursuant to deployment of the package; and
   displaying a data management User Interface (UI) to an administrator to manage the hub and the one or more spokes activated within the production environment, wherein the data management UI permits addition of shared data to be exposed, removal of shared data to be exposed, addition of new connections from the hub to permitted spokes, and alteration of access rights and restrictions for the shared data.

12. The method of claim 1:
   wherein a user interface operates at a user client device remote from the system and communicatively interfaces with the system via a public Internet;
   wherein the system operates within a host organization as a cloud based service provider to the user client device; and
   wherein the request from the hub for access to the shared data is received at the host organization from the user client device.

13. The method of claim 12:
   wherein the database system operates within the host organization as a multi-tenant database system having elements of hardware and software that are shared by a plurality of separate and distinct customer organizations, each of the separate and distinct customer organizations being remotely located from the host organization; and
   wherein each customer organization is an entity selected from the group consisting of: a separate and distinct remote organization, an organizational group within the host organization, a business partner of the host organization, or a customer organization that subscribes to cloud computing services provided by the host organization.

14. Non-transitory computer readable storage media having instructions stored thereon that, when executed by a hardware processor of a system, the instructions cause the system to perform operations comprising:
   storing data in a database system communicably interfaced with the system;
   allocating at least a sub-set of the data to be exposed by the database system shared as shared data, wherein the sub-set of the data includes one or more queryable objects stored at the database system;
   configuring a package for deployment into a production environment, wherein the package includes a pre-configured hub to expose the shared data to a proxy user and one or more pre-configured spokes bound to the pre-configured hub, wherein each of the one or more pre-configured spokes defines access rights to the shared data of the pre-configured hub, via the proxy user, through a queryable proxy object void of the shared data;
   deploying the package into the production environment to activate a hub and one or more spokes within the production environment corresponding to the pre-configured hub and the one or more pre-configured spokes of the package;

wherein the queryable proxy object is configured to proxy any received query to a corresponding proxy user at the hub and further wherein the corresponding proxy user at the hub is configured to query the one or more queryable objects stored at the database system responsive to the proxied query from the spoke;

receiving a request from the hub for access to the shared data via the proxy user at the hub; and returning a response to the hub having made the request.

15. The non-transitory computer readable storage media of claim 14, wherein deploying the package into the production environment, comprises performing a silent deployment of the package into the production environment without requiring requesting any hub information from a spoke administrator during the deployment process to yield a fully automated installation of the package within the production environment.

16. The non-transitory computer readable storage media of claim 14, wherein configuring the package for deployment into a production environment with the pre-configured hub to expose the shared data to a proxy user and the one or more pre-configured spokes bound to the pre-configured hub, comprises performing early binding of the one or more spokes activated within the production environment via the deployment of the package to establish a sharing scheme within the package to be deployed in advance of deploying the package to the production environment and without making the sharing scheme live within the production environment.

17. The non-transitory computer readable storage media of claim 14, wherein the instructions, when execute by the hardware processor of the system, cause the system to perform operations further comprising:

activating the hub and the one or more spokes within the production environment pursuant to deployment of the package; and displaying a data management User Interface (UI) to an administrator to manage the hub and the one or more spokes activated within the production environment, wherein the data management UI permits addition of shared data to be exposed, removal of shared data to be exposed, addition of new connections from the hub to permitted spokes, and alteration of access rights and restrictions for the shared data.

18. The non-transitory computer readable storage media of claim 14, wherein the instructions, when execute by the hardware processor of the system, cause the system to perform operations further comprising:

configuring a second package for deployment into the production environment, wherein the package includes a second pre-configured hub to expose a second sub-set of data to a second proxy user;

wherein the second package includes late binding of a second hub and spoke combination, wherein the second package is deployable to any customer organization interacting with the database system having a required set of permissions; and wherein the customer organizations to which the second package deployable are unknown at the time of packaging of the second package.

19. A system comprising:

a hardware processor and a memory to execute instructions at the system;

a database system to store data;

a sharing configurator to allocate at least a sub-set of the data to be exposed by the database system shared as shared data, wherein the sub-set of the data includes one or more queryable objects stored at the database system;

the sharing configurator to configure a package for deployment into a production environment, wherein the package includes a pre-configured hub to expose the shared data to a proxy user and one or more pre-configured spokes bound to the pre-configured hub, wherein each of the one or more pre-configured spokes defines access rights to the shared data of the pre-configured hub, via the proxy user, through a queryable proxy object void of the shared data;

the sharing configurator to deploy the package into the production environment to activate a hub and one or more spokes within the production environment corresponding to the pre-configured hub and the one or more pre-configured spokes of the package;

wherein the queryable proxy object is configured to proxy any received query to a corresponding proxy user at the hub and further wherein the corresponding proxy user at the hub is configured to query the one or more queryable objects stored at the database system responsive to the proxied query from the spoke;

a request interface to receive a request from the hub for access to the shared data via the proxy user at the hub; and the request interface to return a response to the hub having made the request.

20. The system of claim 19, wherein the sharing configurator is to deploy the package into the production environment by performing a silent deployment of the package into the production environment without requiring requesting any hub information from a spoke administrator during the deployment process to yield a fully automated installation of the package within the production environment.

* * * * *